United States Patent [19]

Przytulski et al.

[11] Patent Number: 5,131,813

[45] Date of Patent: * Jul. 21, 1992

[54] TURBINE BLADE OUTER END ATTACHMENT STRUCTURE

[75] Inventors: James C. Przytulski, Fairfield; Richard L. Horvath, Hamilton; Philip H. Stoughton, Cincinnati, all of Ohio

[73] Assignee: General Electric Company, Cincinnati, Ohio

[*] Notice: The portion of the term of this patent subsequent to Jul. 21, 2009 has been disclaimed.

[21] Appl. No.: 505,118

[22] Filed: Apr. 3, 1990

[51] Int. Cl.$^5$ .................................. F01D 5/32
[52] U.S. Cl. ........................... 416/217; 416/218; 416/220 R
[58] Field of Search .............. 416/129, 193 A, 198 A, 416/204 A, 215, 217, 218, 219 R, 220 R; 415/189, 190, 191, 209.2, 209.3

[56] References Cited

U.S. PATENT DOCUMENTS

| | | | |
|---|---|---|---|
| 747,523 | 12/1903 | Wilkinson | 416/217 |
| 2,851,246 | 9/1958 | Nichols | 415/190 |
| 3,165,294 | 1/1965 | Anderson | 253/77 |
| 3,326,523 | 6/1967 | Bobo | 253/78 |
| 3,365,173 | 1/1968 | Lynch et al. | 415/209.2 |
| 3,423,071 | 1/1969 | Noren | 415/209.2 |
| 3,807,891 | 4/1974 | McDow et al. | 415/116 |
| 3,824,030 | 7/1974 | DeFeo | 416/198 A |
| 4,314,792 | 2/1982 | Chaplin . | |
| 4,425,078 | 1/1984 | Robbins | 415/209.3 |
| 4,687,413 | 8/1987 | Prario | 415/190 |
| 4,738,590 | 4/1988 | Butler | 416/129 |
| 4,856,963 | 8/1989 | Klapproth et al. | 415/189 |
| 4,907,944 | 3/1990 | Kroger et al. | 415/65 |
| 5,007,800 | 4/1991 | Hacault et al. | 416/220 R |
| 5,018,941 | 5/1991 | Heartel et al. | 416/220 R |

FOREIGN PATENT DOCUMENTS

| | | |
|---|---|---|
| 0134186 | 3/1985 | European Pat. Off. . |
| 2001398 | 1/1979 | United Kingdom . |
| 2069064 | 8/1981 | United Kingdom . |
| 2128686 | 5/1984 | United Kingdom . |

Primary Examiner—Edward K. Look
Assistant Examiner—James A. Larson
Attorney, Agent, or Firm—Nathan D. Herkamp; Jerome C. Squillaro

[57] ABSTRACT

A gas turbine engine having an outer annular turbine rotor, which is counterrotatable relative to an inner annular turbine rotor, includes attachment structure for attaching turbine blades in circumferential rows to the outer rotor. The attachment structure includes first and second male members spaced axially along and circumferentially extending about the rotor, and first and second grooves spaced axially along and extending circumferentially about the rotor being defined by flanges attached to the rotor. Each male member has a first portion attached to an end of a turbine blade and extending therefrom in a radial direction. The first male member has a second portion attached to its first portion and extending therefrom in an axial direction to define the first male member with an overall hook-like cross-sectional configuration. The first groove is cross-sectionally shaped for receiving in mated relation the second portion of the first male member. The second groove is cross-sectionally shaped for receiving in mated relation in the second groove a lock segment of the locking assembly and the first portion of the second male member to lock the male members in the respective grooves and thereby lock the turbine blade against radial and axial movements relative to the rotor.

26 Claims, 4 Drawing Sheets

TURBINE BLADE OUTER END ATTACHMENT STRUCTURE

CROSS-REFERENCE TO RELATED APPLICATIONS

Reference is hereby made to the following copending U.S. patent applications dealing with related subject matter and assigned to the assignee of the present invention:

1. "Counter Rotation Power Turbine" by Kenneth O. Johnson, assigned U.S. Ser. No. 071,594, filed Jul. 10, 1987, a continuation of application Ser. No. 728,466 and filed May 1, 1985, now abandoned, which was a continuation-in-part of application Ser. No. 437,923, filed Nov. 1, 1982, now abandoned.

2. "Interstage Seal Arrangement For Airfoil Stages of Turbine Engine Counterrotating Rotors" by Przytulski et al., assigned U.S. Ser. No. 07/505,120 and filed concurrently herewith.

3. "Turbine Blade Inner End Attachment Structure" by Przytulski et al., assigned U.S. Ser. No. 07/505,121 and filed concurrently herewith.

BACKGROUND OF THE INVENTION

1. Field of the Invention

The present invention relates generally to gas turbine engines and, more particularly, is concerned with an attachment structure useful for attaching turbine blades at their outer ends to a rotor of a gas turbine engine.

2. Description of the Prior Art

Gas turbine engines generally include a gas generator which comprises a compressor for compressing air flowing aft through the engine, a combustor in which fuel is mixed with the compressed air and ignited to form a high energy gas stream, and a turbine driven by the gas stream which is connected by a shaft to, in turn, drive the compressor. Many engines further include a second turbine, known as a power turbine, located aft of the gas generator and which extracts energy from the gas flow to drive a rotating load such as found in the propulsor of helicopters and turboprop engines and fixed pitch blades in ducted turbofan engines.

A recent improvement over the turbofan and turboprop engines is an unducted fan engine such as disclosed in the first U.S. patent application cross-referenced above. In the unducted fan engine, the power turbine includes counterrotating rotors with turbine blades defining counterrotating airfoil stages which drive in corresponding fashion unducted fan blades located radially outwardly with respect to the power turbine. The fan blades of the unducted fan engine are variable pitch blades to achieve optimum performance under varying operating conditions.

In prior art turbine engines, dovetail structures have been widely accepted as efficient means of attaching turbine blades to structural components, such as a turbine rotor. However, in view of the relatively low rotational speeds of the counterrotating rotors in the power turbine of the unducted fan engine, more flexibility is allowed in the design of turbine blade attachment structures to meet restrictive weight requirements. Further, the attachment of the blades at the radially outer end rather than the radially inner end requires a different structure.

Consequently, a need exists for alternative approaches which take advantage of this added flexibility to provide lightweight structures to accommodate the attachment of turbine blades to the outer casing of a counterrotating rotor in turbomachinery applications.

SUMMARY OF THE INVENTION

The present invention provides a turbine blade end attachment structure designed to satisfy the aforementioned needs. The attachment structure of the present invention is particularly applicable to attaching the outer end of a turbine blade to the outer one of the counterrotating rotors in the unducted fan engine where there is a requirement to restrain airfoil pretwist imposed by the blade tip shroud. The attachment structure constituting the invention of the third patent application cross-referenced is particularly applicable to attaching the inner end of a turbine blade to the inner one of the counterrotating rotors in the unducted fan engine. The concepts underlying the attachment structures of both the present invention and that of the third cross-referenced application can be employed with either individual airfoils (or blades) or with multi-airfoil segment components in turbomachinery applications.

Accordingly, the present invention is directed to an attachment structure for attaching turbine blades in one or more circumferential rows to a rotor of a gas turbine engine. The attachment structure comprises: (a) first and second male members spaced axially along and extending circumferentially about the rotor blade row; (b) a locking assembly separate from the male members; and (c) means attached to the rotor defining first and second grooves spaced axially along and extending circumferentially about the rotor.

More particularly, each male member has a first portion attached to an end of a turbine blade and extending therefrom in a radial direction. The first male member has a second portion attached to its first portion and extending therefrom in an axial direction. Also, the locking assembly includes a lock member.

Further, the first groove is cross-sectionally shaped for receiving in mated relation the second portion of the first male member. The second groove is cross-sectionally shaped for receiving and permitting axial movement of the first portion of the second male member with axial movement of the turbine blade to align with and insert in mated relation within the first groove the second portion of the first male member and for then receiving in mated relation in the second groove the lock member of the locking assembly and the first portion of the second male member to lock the male members in the respective grooves and thereby lock the turbine blade against radial and axial movements relative to the rotor.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views. Also, in the following description, it is to be understood that such terms as "forward," "rearward," "left," "right," "upwardly," "downwardly," and the like, are words of convenience and are not to be construed as limiting terms.

In General

Figure 1:
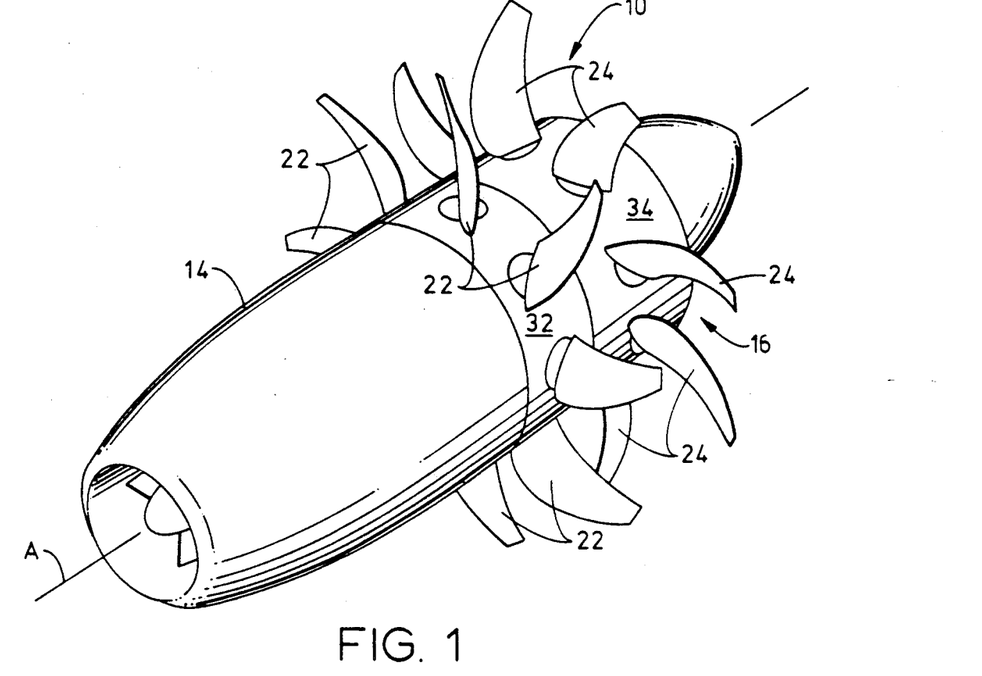
FIG. 1 is a perspective view an unducted fan type gas turbine engine in which the turbine blade end attachment structure of the present invention can be employed.
Figure 2:
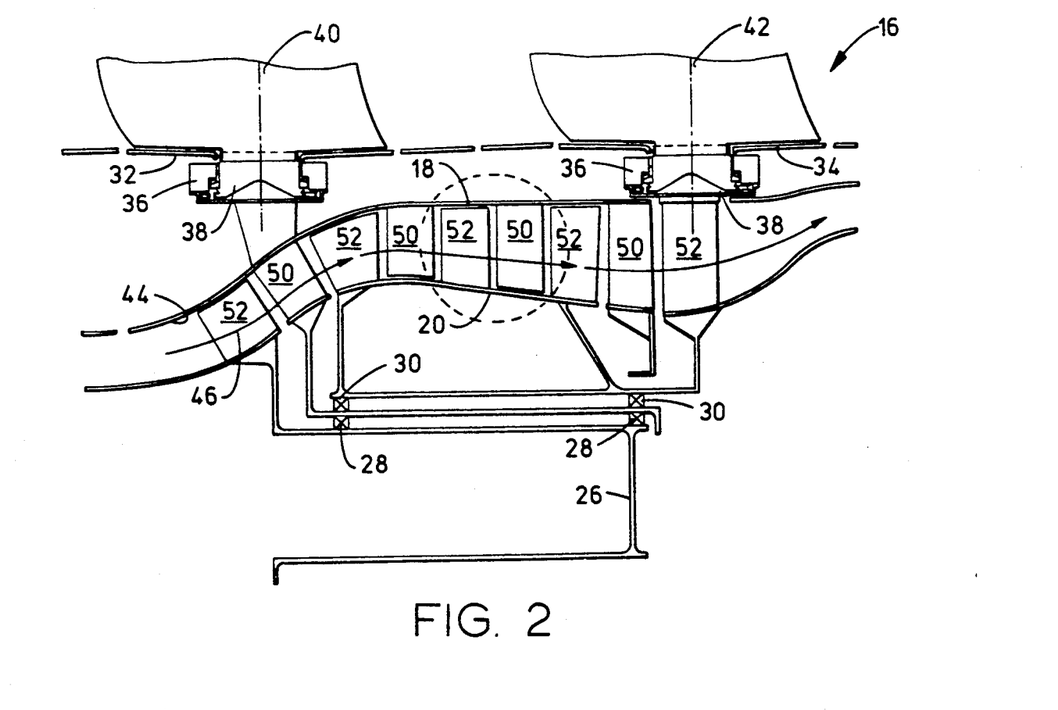
FIG. 2 is a schematic axial sectional view of a turbine section of the unducted fan engine of FIG. 1.
Figure 3:
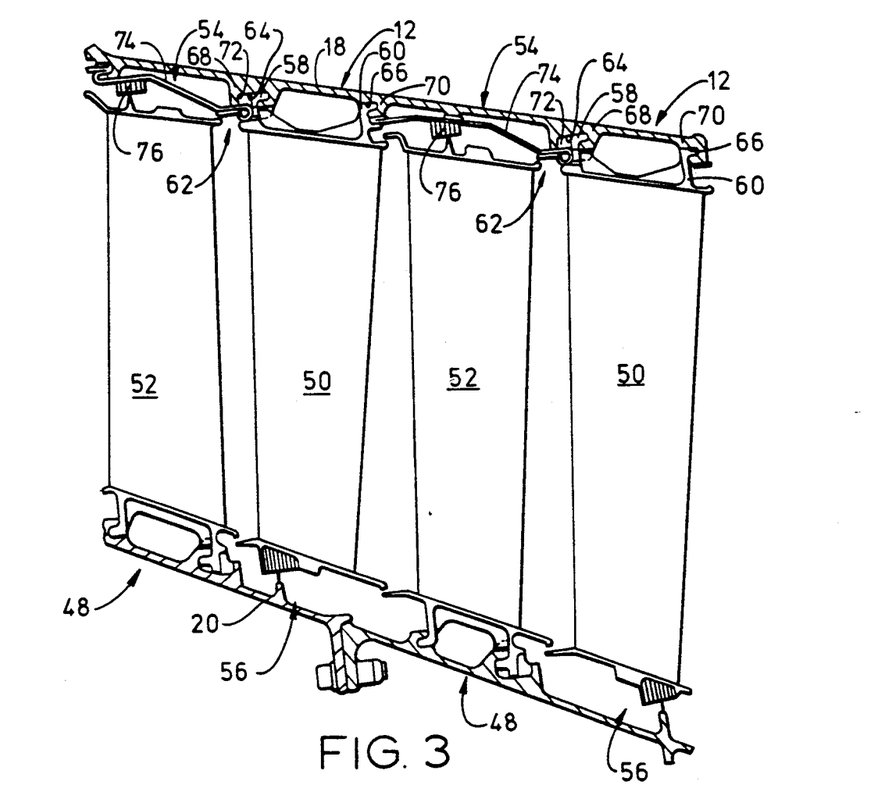
FIG. 3 is an enlarged fragmentary detailed view of the portion of turbine section encircled in FIG. 2.

Referring now to the drawings, and particularly, to FIG. 1, there is shown a gas turbine engine 10 of the unducted fan type which incorporates the preferred embodiment of the turbine blade end attachment structure of the present invention, generally designated 12 in FIG. 3. The engine 10 has an outer shroud or nacelle 14 which encompasses a forward gas generator (not shown) and an aft power turbine 16, illustrated schematically in FIG. 2. In a known manner, the gas generator produces combustion gases which are channeled to the power turbine 16.

As seen in FIG. 2, the power turbine 16 includes first (or outer) and second (or inner) annular turbine rotors 18, 20 which are adapted to rotate in opposite directions, or counterrotate, about a longitudinal centerline axis A of the engine 10. The rotors 18, 20 respectively mount for rotation therewith tandemly-arranged forward and rearward sets of propulsor blades 22, 24. The first, outer rotor 18 is rotatably mounted about a static structure 26 of the engine 10 by a first set of bearings 28, whereas the second, inner rotor 20 is rotatably mounted about the first rotor 18 by a second set of bearings 30.

The nacelle 14 encompasses the rotors 18, 20 with the sets of propulsor blades 22, 24 extending circumferentially and radially outward from the exterior of the nacelle 14. The nacelle 14 includes a first, or forward, cowl 32 which is coupled to and rotatable with the forward set of propulsor blades 22, and a second, or rearward, cowl 34 which is coupled to and rotatable with the rearward set of propulsor blades 24. The exterior configuration of the nacelle 14 provides proper airflow characteristics to optimize the performance of the propulsor blades 22, 24 and thereby of the engine 10.

To further optimize the performance of the engine 10, the pitch of the propulsor blades 22, 24 can be varied to correspond to specific operating conditions. The blades 22, 24 of the forward and rearward sets thereof are rotatably mounted by hubs 36 to the interior sides of the forward and rearward nacelle sleeves 32, 34 and coupled to pitch varying mechanisms 38 operable for rotating the blades 22, 24 about respective pitch change axes 40, 42. Attention is directed to U.S. Pat. No. 4,738,590, issued Apr. 19, 1988, to Butler and assigned to the assignee of the present invention, for a detailed description of a blade pitch varying mechanism.

The aft power turbine 16 also has an annular gas flowpath 44 for receiving combustion gases from the forward gas generator of the engine 10. The gas flowpath extends between the outer and inner rotor casings 18, 20 of the power turbine 16 and combustion gases flow therethrough as a high energy gas stream 46. The outer and inner rotor casings 18, 20 of the power turbine 16 respectively mount, via turbine blade outer and inner end attachment structures 12, 48, respectively, axially spaced rows of circumferentially and radially extending turbine blades 50, 52 which alternate with one another so as to define counterrotatable airfoil stages extending across the annular gas flowpath 44. Also, outer and inner interstage seal structures 54, 56 are provided for limiting passage of the gas stream 46 between the outer and inner rotor casings 18, 20 and outer and inner ends of the respective turbine blades 52, 50. The inner interstage seal structure 56 and blade inner end attachment structure 48 shown in FIG. 3 are merely exemplary ones of several different attachment and seal structures which can be employed in the turbine engine 10. These structures are the subject of the second and third patent applications cross-referenced above and are not described in detail herein, because they do not constitute a part of the turbine blade end attachment structure 12 of the present invention.

Thus, the high energy gas stream 46 flowing through the annular gas flowpath 44 between the rotor casings 18, 20 drives the sets of turbine blades 50, 52 in counterrotation, i.e., in opposite directions about circular paths, in turn, causing the respective rotor casings 18, 20 to counterrotate.

Turbine Blade End Attachment Structures of the Present Invention

The turbine blades 50 in the circumferential rows thereof are attached at their outer ends 50A to the outer rotor casing 18 by the end attachment structure 12 in accordance with the principles of the present invention. The attachment structure 12 can be employed with either single blades 50 or multi-blade segments. For convenience of description, it is described hereinafter as employed to attach a single blade 50. Further, while the end attachment structure 12 is illustrated and described herein in an application for attaching outer ends of the turbine blades 50 to the interior side of the outer rotor casing 18 in the unducted fan-type gas turbine engine 10, it should be understood that possible applications of the attachment structure 12 are not so limited; for example, it could also be used for attaching inner ends of turbine blades in the same or other applications.

FIGS. 3-6 illustrate a preferred embodiment of the turbine blade end attachment structure 12. In its basic components, the end attachment structure 12 includes forward and aft male members 58, 60 axially spaced along and circumferentially extending about the inner surface of outer rotor casing 18, a locking assembly 62 separate from the male members 58, 60, and forward and aft grooves 64, 66 axially spaced along and circumferentially extending about the inner surface of the outer rotor 18 being defined by forward and aft flanges 68, 70 of the outer rotor.

Figure 4:
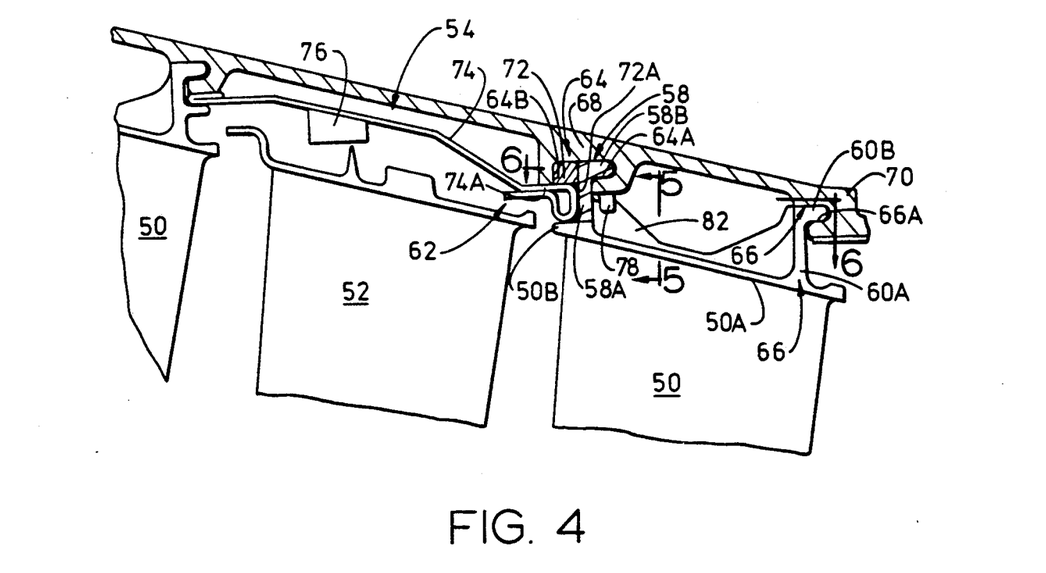
FIG. 4 is an enlarged fragmentary view of the turbine section portion of FIG. 3 illustrating a preferred form of a turbine blade end attachment structure of the present invention.

More particularly, the forward and aft male members 58, 60 each have first and second portions 58A, 58B and 60A, 60B defining a hook-like or inverted-L shaped configuration. The first portion 58A, 60A of each male member 58, 60 is attached to outer end 50A of the turbine blade 50 and extends therefrom in an outward radial direction. The second portion 58B, 60B of each male member 58, 60 is integrally attached to its first portion 58A, 60A and extends therefrom in a common axial direction and generally transverse to the first portion 58A, 60A to define the overall hook-like cross-sectional configuration of the male members 58, 60.

The forward and aft grooves 64, 66 defined by the flanges 68, 70 have mating portions 64A, 66A which open in a common axial direction and are cross-sectionally shaped for receiving in mated relation respectively and concurrently the second portions 58B, 60B of the forward and aft male members 58, 60. The forward groove 64 also has a locking portion 64B which communicates with the mating portion 64A thereof, opens in an inward radial direction away from the interior side of the outer rotor 18 and is cross-sectionally shaped for receiving in locking relation a lock member 72 of the locking assembly 62 and the first portion 58A of the forward male member 58. Further, the forward groove 64 is cross-sectionally shaped such that, prior to receiving the lock member 72 therein, the first portion 58A of the forward male member 58 can be axially moved with axial movement of the turbine blade 50 to align with and insert in mated relation within the mating portions 64A, 66A of the forward and aft grooves 64, 66 the second portions 58B, 60B of the male members 58, 60. Once the second portions 58B, 60B of the male members 58, 60 are inserted in mating relations in the mating portions 64A, 66A of the forward and aft grooves 64, 66, then the lock member 72 of the locking assembly 62 can be installed in mated relation in the locking portion 64B of the forward groove 64 alongside the first portion 58B of the forward male member 58, as seen in FIG. 4, to lock the male members 58, 60 in the respective grooves 64, 66 and thereby lock the turbine blade 50 against both radial and axial movements relative to the outer rotor 18.

The lock members 72 of the locking assembly 62 are preferably curved or arcuate shaped to closely conform to the curvature of the forward flange 68. The lock member 72, being inserted after the blade 50 and positioned between the heel of the forward male member second portion 58B and the portion of the flange 68 defining the forward wall of the locking portion 64B of the forward groove 64, serves to axially restrain the blade 50 and react the moment imparted to the blade outer end 50A by the pretwist of the blade shroud tip. The circumferential length of the lock member 72 is sized to minimize the quantity required to extend 360 degrees about the rotor 18 but still limit the effort required for their installation when considering the pretwist of the blades 50. If feasible, the lock member 72 is preferably made of wear resistant material and could be a complete ring with a radial split line to allow assembly.

In the preferred embodiment of the attachment structure 12, as illustrated in FIG. 3-6, the locking assembly 62 also includes a retainer member 74 in the form of a sheet metal shroud that bridges the successive stage of blades 52 and mounts a honeycomb structure 76 of the outer interstage seal structure 54. The aft edge 74A of the retainer member 74, having a looped configuration, interfits between a forward edge 50B on the outer end 50A of the turbine blade 50 and a side 72A of the lock member 72 spaced from and facing toward the turbine blade outer end forward edge 50B.

Figures 5, 6:
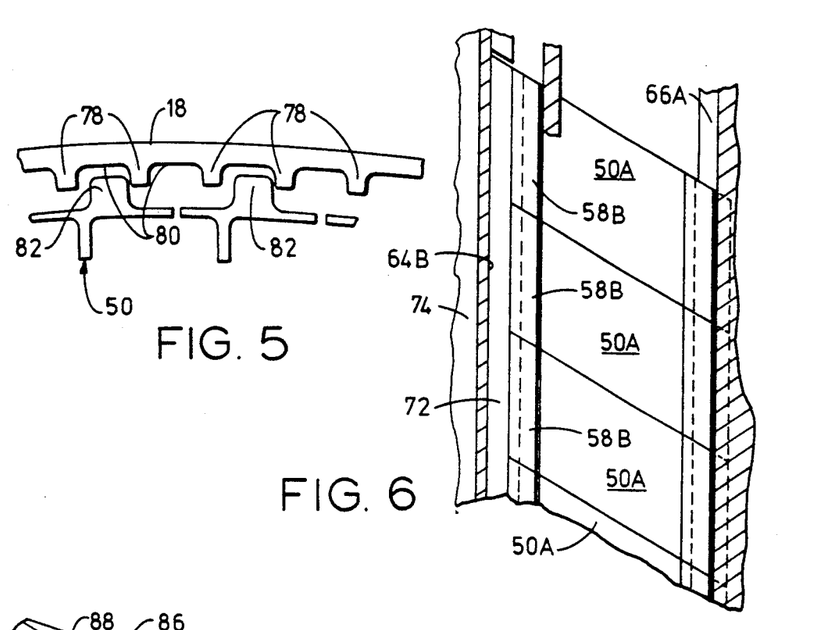
FIG. 5 is an elevational view of the attachment structure as seen along line 5—5 of FIG. 4.
FIG. 6 is a plan view of the attachment structure as seen along line 6—6 of FIG. 4.

As best seen in FIGS. 4 and 5, the preferred embodiment of the attachment structure 12 further includes elements in the form of a row of gussets 78 attached to, projecting radially inward from, and extending in circumferentially spaced relation along the forward flange 68 of the outer rotor 18 so as to define slots 80 therebetween in a circumferential row thereof, and elements in the form of a row of gussets 82 attached to, projecting radially outward from, and extending in circumferentially spaced relation along the outer end 50A of the turbine blade 50. The outer rotor slots 80 and the blade gussets 82 are disposed in an interfitting relation so as to restrain movement of the turbine blade 50 in circumferential relation to the outer rotor 18.

Figure 7:
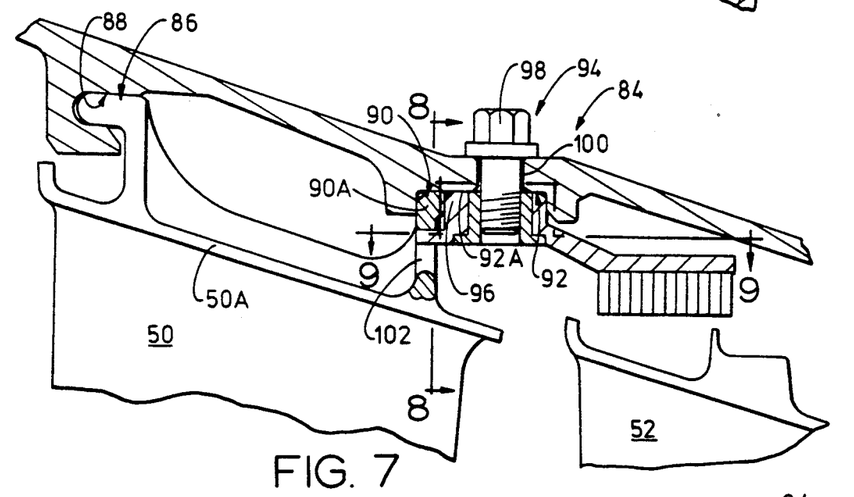
FIG. 7 is an enlarged fragmentary view similar to FIG. 4, but showing a first alternative form of a turbine blade end attachment structure of the present invention.
Figure 8:
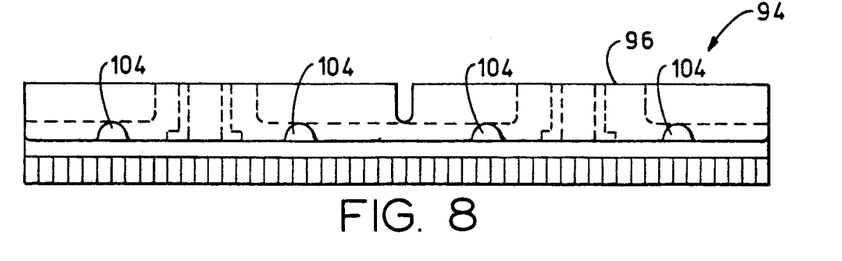
FIG. 8 is an elevational view of the attachment structure as seen along line 8—8 of FIG. 7.
Figure 9:
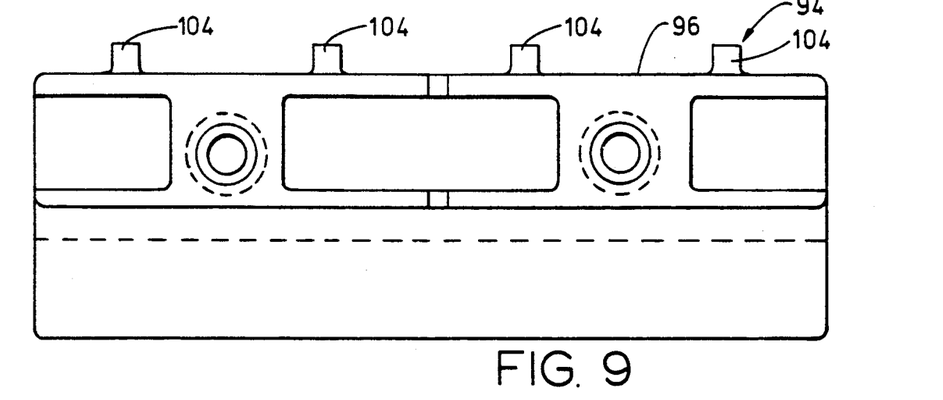
FIG. 9 is a plan view of the attachment structure as seen along line 9—9 of FIG. 7.

Referring now to FIGS. 7-9, there is shown a first modified or alternative form or embodiment of the end attachment structure, generally designated by the numeral 84. The first modified attachment structure 84 has a forward male member 86 and forward groove 88 substantially identical to but the reverse of the aft male member 60 and aft groove 66 of the preferred attachment structure 12 in FIGS. 3-6. The differences reside in the configuration of the aft male member 90 and aft groove 92 of the first modified attachment structure 84 compared to the forward male member 58 and forward groove 64 of the preferred attachment structure 12, and also resides in the configuration of the locking assembly 94 of the first modified attachment structure 84 compared to the locking assembly 62 of the preferred attachment structure 12.

The aft male member 90 has a first portion 90A which extends radially outward from the blade outer end 50A but has no comparable second portion thereon. The aft groove 92 only has a locking portion 92A which opens in a radial direction away from the interior side of the outer rotor 18 for receiving in locking relation a lock member 96 of the locking assembly 94 and the first portion 90A of the aft male member 90. The locking assembly 94 also includes circumferentially spaced fasteners 98 (only one shown) for attaching the lock member 96, via apertures 100 in the outer rotor 18, within the locking portion 92A of the aft groove 92 for retaining the same in locking relation side-by-side with the aft male member first portion 90A.

The locking assembly 94 also includes circumferentially spaced slots 102 defined in the first portion 90A of the aft male member 90 and tabs 104 attached to, projecting axially forward from, and extending in circumferentially spaced relation along the forward side of the lock member 96. The slots 102 and tabs 104 are disposed in interfitting relation so as to restrain movement of the turbine blade 50 in circumferential relation to the outer rotor 18.

Figure 10:
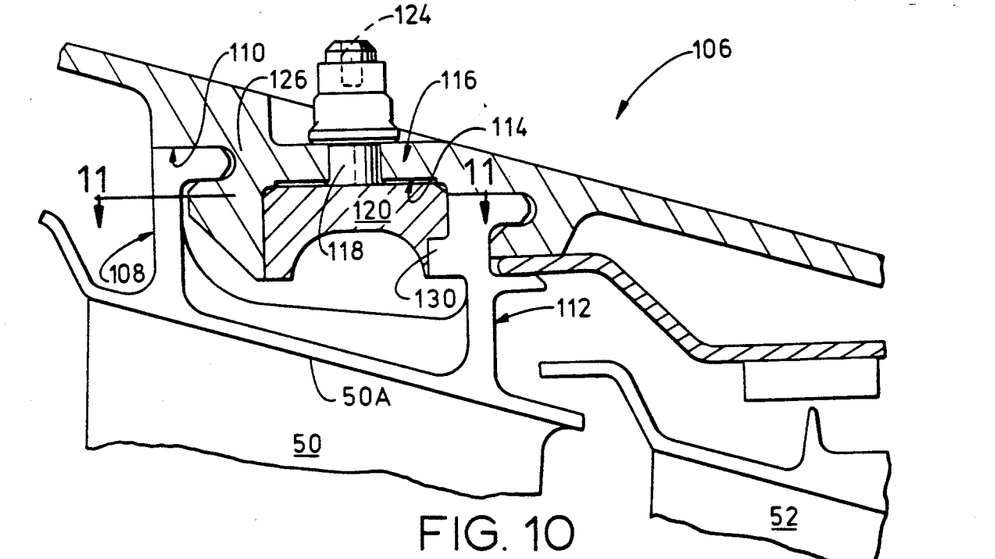
FIG. 10 is an enlarged fragmentary view similar to FIG. 4, but showing a second alternative form of a turbine blade end attachment structure of the present invention.
Figure 11:
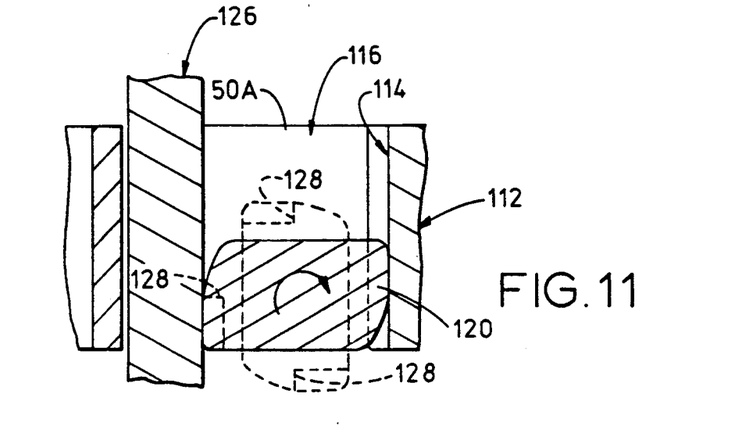
FIG. 11 is a sectional view of the attachment structure taken along line 11—11 of FIG. 10.

Referring now to FIGS. 10-11, there is shown a second alternative or modified form or embodiment of the end attachment structure, generally designated by the numeral 106. The second modified attachment structure 106 has a forward male member 108 and forward groove 110 substantially identical to the aft male member 60 and aft groove 66 of the preferred attachment structure 12 in FIGS. 3-6. Also, the second modified attachment structure 106 has an aft male member 112 and aft groove 114 substantially identical to the forward male member 58 and forward groove 64 of the preferred attachment structure 12. The difference resides in the configuration of the locking assembly 116 of the second modified attachment structure 106 compared to the locking assembly 62 of the preferred attachment structure 12.

The locking assembly 116 of the second modified attachment structure 106 has a lock member composed of combinations of circumferentially spaced shafts 118 and cam elements 120 (only one of each being shown). Each shaft 118 is rotatably mounted to the outer rotor 18, via an aperture 122, in alignment with the aft groove 114. The cam element 120 is attached on the shaft 118 for rotation therewith and is disposed within the aft groove 114. The shaft 118 has a socket 124 for insertion of the end of a tool for turning the shaft. The cam element 120 has a pair of opposite lobes 128 which, upon selected rotation of the shaft 118, are capable of being moved between locking and unlocking positions (shown respectively in solid and broken line forms in FIG. 11) relative to the aft male member 112 and an aft flange 126 on the outer rotor 18 defining the forward wall of the aft groove 114.

Further, stop elements in the form of ledges or shoulders 130 are defined respectively on the forward male member 108 and the aft male member 112 for engagement with lobes 128, blocking further rotation when the cam element 120 reaches the locking position.

Also, both the first and second modified attachment structures 84, 106 have similar extensions which mount and position honeycomb structures for adjacent interstage seals.

The major advantages of each of the embodiments 12, 84 and 106 of the attachment structure of the present invention is its ability to maintain blade interlock pretwist and provide a means of damping airfoil vibratory modes with a relatively compact and lightweight set of hardware. At the same time, the attachment structure accurately positions and reliably connects the blades 50 to the outer rotor 18.

It is thought that the present invention and many of its attendant advantages will be understood from the foregoing description, and it will be apparent that various changes may be made in the form, construction and arrangement of the parts thereof without departing from the spirit and scope of the invention or sacrificing its material advantages, the forms hereinbefore described being merely preferred or exemplary embodiments thereof.

We claim:

1. An attachment structure for attaching turbine blades in a circumferential row to a rotor of a gas turbine engine, said attachment structure comprising:
    (a) first and second male members spaced axially along and extending circumferentially about the rotor, each male member having a first portion attached to an end of a turbine blade and extending therefrom in a radial direction, said first male member having a second portion attached to its said first portion and extending therefrom in an axial direction;
    (b) a locking assembly separate from said male members, said locking assembly including a lock member; and
    (c) means attached to a rotor defining first and second grooves spaced axially along and extending circumferentially about the rotor, said first groove being cross-sectionally shaped for receiving in mated relation said second portion of said first male member, said second groove being cross-sectionally shaped for receiving and permitting axial movement of said first portion of said second male member with axial movement of the turbine blade to align with and insert in mated relation within said first groove said second portion of said first male member and for then receiving in mated relation in said second groove said lock member of said locking assembly and said first portion of said second male member to removably lock said male members in said respective grooves and thereby lock the turbine blade against radial and axial movements relative to the rotor.

2. The attachment structure as recited in claim 1, wherein said first and second male members each have said first and second portions defining each of said male members with a hook-like configuration.

3. The attachment structure as recited in claim 2, wherein said first and second grooves each have mating portions which open in a common axial direction for receiving in mated relation respectively and concurrently said second portions of said first and second male members.

4. The attachment structure as recited in claim 3, wherein said second groove also has a locking portion which communicates with said mating portion thereof and opens in a radial direction away from the rotor for receiving in locking relation said lock member and said first portion of said second male member.

5. The attachment structure as recited in claim 4, wherein said locking assembly also includes a retainer member for interfitting between a portion of the turbine blade end and a side of said lock member spaced from and facing toward the turbine blade end.

6. The attachment structure as recited in claim 4, wherein said lock member of said locking assembly includes:
    at least one shaft circumferentially spaced apart and rotatably mounted to the rotor in alignment with said second groove; and
    a cam element attached to said shaft and disposed within said second groove, said cam element having a pair of opposite lobes which, upon selected rotation of said shaft, are capable of being moved between locking and unlocking positions relative to said second male member and means on said rotor defining said locking portion of said second groove.

7. The attachment structure as recited in claim 6, further comprising:
    stop elements defined respectively on said cam element and said second male member for engagement blocking further rotation when said cam element reaches said locking position.

8. The attachment structure as recited in claim 1, wherein:

said first and second portions of said first male member provide said first male member with a hook-like configuration; and said first groove has a mating portion which opens in an axial direction for receiving in mated relation said second portion of said first male member.

9. The attachment structure as recited in claim 8, wherein said second groove has a locking portion which opens in a radial direction away from the rotor for receiving in locking relation said lock member and said first portion of said second male member.

10. The attachment structure as recited in claim 9, wherein:

said first portion of said second male member has a plurality of circumferentially spaced slots defined therein; and said lock member has a plurality of tabs attached to, projecting axially, and extending in circumferentially spaced relation therealong;

said respective pluralities of slots and tabs being disposed in interfitting relation so as to restrain movement of the turbine blade in circumferential relation to the rotor.

11. The attachment structure as recited in claim 9, wherein said locking assembly also including at least one fastener for attaching said lock member within said locking portion of said second groove for retaining the same in the locking relation.

12. The attachment structure as recited in claim 1, further comprising:

a first plurality of elements attached to and extending in circumferentially spaced relation along the rotor; and a second plurality of elements attached to and extending in circumferentially spaced relation along the end of the turbine blade;

said first and second pluralities of elements disposed in interfitting relation so as to restrain movement of the turbine blade in circumferential relation to the rotor.

13. The attachment structure as recited in claim 12, wherein one of said first and second pluralities of elements is a row of projecting tabs and the other is a row of slots which receive the tabs.

14. In a gas turbine engine having a rotor and a plurality of turbine blades, an attachment structure for attaching said turbine blades at outer ends thereof to said rotor in a circumferential row, said attachment structure comprising:

(a) first and second male members spaced axially along and extending circumferentially about the rotor, each male member having a first portion attached to said outer end of at least one of said turbine blades and extending therefrom in a radial direction, said first male member having a second portion attached to its said first portion and extending therefrom in an axial direction;

(b) a locking assembly separate from said male members, said locking assembly including a lock member; and (c) means attached to said rotor defining first and second grooves spaced axially along and extending circumferentially about the rotor, said first groove being cross-sectionally shaped for receiving in mated relation said second portion of said first male member, said second groove being cross-sectionally shaped for receiving and permitting axial movement of said first portion of said second male member with axial movement of said turbine blade to align with and insert in mated relation within said first groove said second portion of said first male member and for then receiving in mated relation in said second groove said lock member of said locking assembly and said first portion of said second male member to removably lock said male members in said respective grooves and thereby lock said turbine blade against radial and axial movements relative to said rotor.

15. The attachment structure as recited in claim 14, wherein said first and second male members each have said first and second portions defining each of said male members with a hook-like configuration.

16. The attachment structure as recited in claim 15, wherein said first and second grooves each have mating portions which open in a common axial direction for receiving in mated relation respectively and concurrently said second portions of said first and second male members.

17. The attachment structure as recited in claim 16, wherein said second groove also has a locking portion which communicates with said mating portion thereof and opens in a radial direction away from said rotor for receiving in locking relation said lock member and said first portion of said second male member.

18. An attachment structure as recited in claim 17, wherein said locking assembly also includes a retainer member for interfitting between a portion of said turbine blade outer end and a side of said lock member spaced from and facing toward said turbine blade outer end.

19. The attachment structure as recited in claim 17, wherein said lock member of said locking assembly includes:

at least one shaft circumferentially spaced apart and rotatably mounted to said rotor in alignment with said second groove; and a cam element attached to said shaft and disposed within said second groove, said cam element having a pair of opposite lobes which, upon selected rotation of said shaft, are capable of being moved between locking and unlocking positions relative to said second male member and means on said rotor defining said locking portion of said second groove.

20. The attachment structure as recited in claim 19, further comprising:

stop elements defined respectively on said cam element and said second male member for engagement blocking further rotation when said cam element reaches said locking position.

21. The attachment structure as recited in claim 14, wherein:

said first and second portions of said first male member provide said first male member with a hook-like configuration; and said first groove has a mating portion which opens in an axial direction for receiving in mated relation said second portion of said first male member.

22. An attachment structure as recited in claim 21, wherein said second groove has a locking portion which opens in a radial direction away from the rotor for receiving in locking relation said lock member and said first portion of said second male member.

23. The attachment structure as recited in claim 22, wherein:

said first portion of said second male member has a plurality of circumferentially spaced slots defined therein; and said lock member has a plurality of tabs attached to, projecting axially, and extending in circumferentially spaced relation therealong;

said respective pluralities of slots and tabs being disposed in interfitting relation so as to restrain movement of the turbine blade in circumferential relation to the rotor.

24. The attachment structure as recited in claim 22, wherein said locking assembly also including at least one fastener for attaching said lock member within said locking portion of said second groove for retaining the same in the locking relation.

25. The attachment structure as recited in claim 14, further comprising:

a first plurality of elements attached to and extending in circumferentially spaced relation along the rotor; and a second plurality of elements attached to and extending in circumferentially spaced relation along the end of the turbine blade;

said first and second pluralities of elements disposed in interfitting relation so as to restrain movement of the turbine blade in circumferential relation to the rotor.

26. The attachment structure as recited in claim 25, wherein one of said first and second pluralities of elements is a row of projecting tabs and the other is a row of slots which receive the tabs.

* * * * *